(12) United States Patent
Mayer

(10) Patent No.: US 9,156,454 B2
(45) Date of Patent: Oct. 13, 2015

(54) CONTROL DEVICE AND METHOD FOR TRANSFERRING BRAKE FLUID INTO AT LEAST ONE WHEEL BRAKE CYLINDER OF A BRAKE SYSTEM OF A VEHICLE

(71) Applicant: Robert Bosch GmbH, Stuttgart (DE)

(72) Inventor: Jochen Mayer, Giengen An Der Brenz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/377,749

(22) PCT Filed: Dec. 17, 2012

(86) PCT No.: PCT/EP2012/075791
§ 371 (c)(1),
(2) Date: Aug. 8, 2014

(87) PCT Pub. No.: WO2013/117280
PCT Pub. Date: Aug. 15, 2013

(65) Prior Publication Data
US 2015/0019100 A1 Jan. 15, 2015

(30) Foreign Application Priority Data
Feb. 10, 2012 (DE) .................. 10 2012 202 006

(51) Int. Cl.
| B60T 8/40 | (2006.01) |
| B60T 8/44 | (2006.01) |
| B60T 13/14 | (2006.01) |
| B60T 13/16 | (2006.01) |
| B60T 13/74 | (2006.01) |
| B60T 17/22 | (2006.01) |
| B60T 8/48 | (2006.01) |

(52) U.S. Cl.
CPC . *B60T 8/40* (2013.01); *B60T 8/442* (2013.01); *B60T 8/4872* (2013.01); *B60T 13/141* (2013.01); *B60T 13/161* (2013.01); *B60T 13/745* (2013.01); *B60T 17/221* (2013.01)

(58) Field of Classification Search
CPC ............. B60T 8/40; B60T 8/44; B60T 8/176; B60T 13/16; B60T 13/14; B60T 13/74
USPC .................. 701/70, 78, 83; 60/413, 545, 585; 303/2, 10, 113.3, 114.1
See application file for complete search history.

(56) References Cited

U.S. PATENT DOCUMENTS

2006/0123776 A1* 6/2006 Viswanathan et al. .......... 60/413
2013/0232965 A1* 9/2013 Ohnishi et al. .................. 60/545

FOREIGN PATENT DOCUMENTS

| DE | 195 03 622 | 8/1996 |
| DE | 196 22 726 | 12/1997 |
| DE | 103 27 563 | 1/2005 |
| DE | 10 2010 002280 | 8/2011 |
| DE | 10 2010 030321 | 12/2011 |

OTHER PUBLICATIONS

International Search Report for PCT/EP2012/075791, dated Aug. 1, 2013.

* cited by examiner

*Primary Examiner* — Tan Q Nguyen
(74) *Attorney, Agent, or Firm* — Kenyon & Kenyon LLP

(57) ABSTRACT

A method for transferring brake fluid into a wheel brake cylinder of a brake system of a vehicle includes: controlling a switchover valve, via which a brake circuit having the wheel brake cylinder is connected to a main brake cylinder, into a closed state; subsequently reducing a booster force of a brake force booster, which is exerted upon an adjustable piston of the main brake cylinder; controlling a high-pressure switchover valve to a partially opened state after the reduction of the booster force of the brake force booster; and sucking in brake fluid via the partially opened, high-pressure switchover valve and pumping the brake fluid into the at least one wheel brake cylinder.

11 Claims, 3 Drawing Sheets

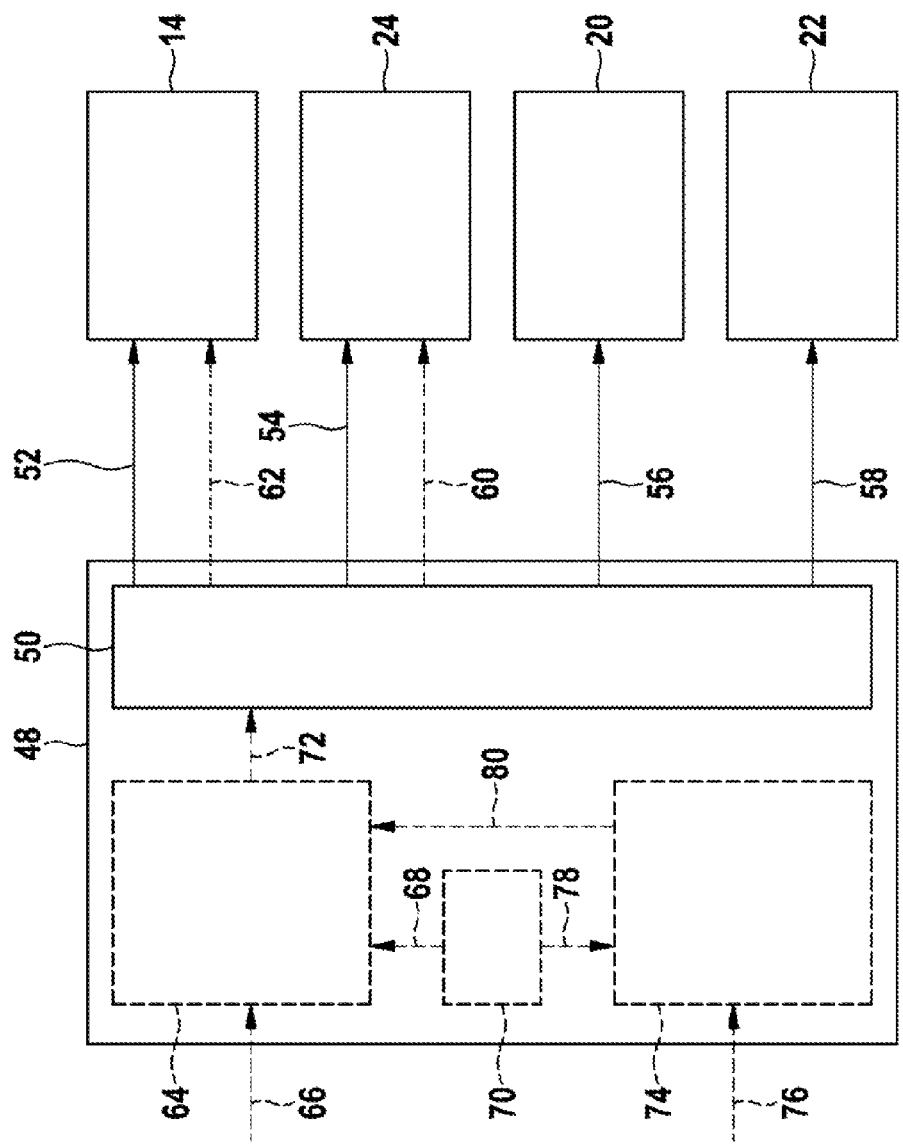

CONTROL DEVICE AND METHOD FOR TRANSFERRING BRAKE FLUID INTO AT LEAST ONE WHEEL BRAKE CYLINDER OF A BRAKE SYSTEM OF A VEHICLE

BACKGROUND OF THE INVENTION

1. Field of the Invention

The present invention relates to a method and a control device for transferring brake fluid into at least one wheel brake cylinder of a brake system of a vehicle.

2. Description of the Related Art

Brake force boosters, such as the electromechanical brake force booster described in published German patent application document DE 103 27 563 A1, are known from the related art.

BRIEF SUMMARY OF THE INVENTION

Using the present invention, it is possible at any time during travel of a vehicle equipped with it to adjust the admission pressure in such a way that, using a pump, which is connected via a high pressure switching valve to a main brake cylinder of the brake system of the vehicle, one is able to pump additional brake fluid into the at least one wheel brake cylinder wheel brake cylinder. Thus, independently of a current operating state of the brake system, the braking pressure is able to be increased in the at least one wheel brake cylinder at any time. Particularly if the driver requires a strong braking power, more rapid braking of the vehicle may thus be reliably ensured by the additional use of the pump. The present invention thus ensures improved braking comfort for the driver of the vehicle equipped with it.

BRIEF DESCRIPTION OF THE DRAWINGS

FIG. 2 shows a schematic representation of a specific embodiment of the control device.

DETAILED DESCRIPTION OF THE INVENTION

Figure 1A:
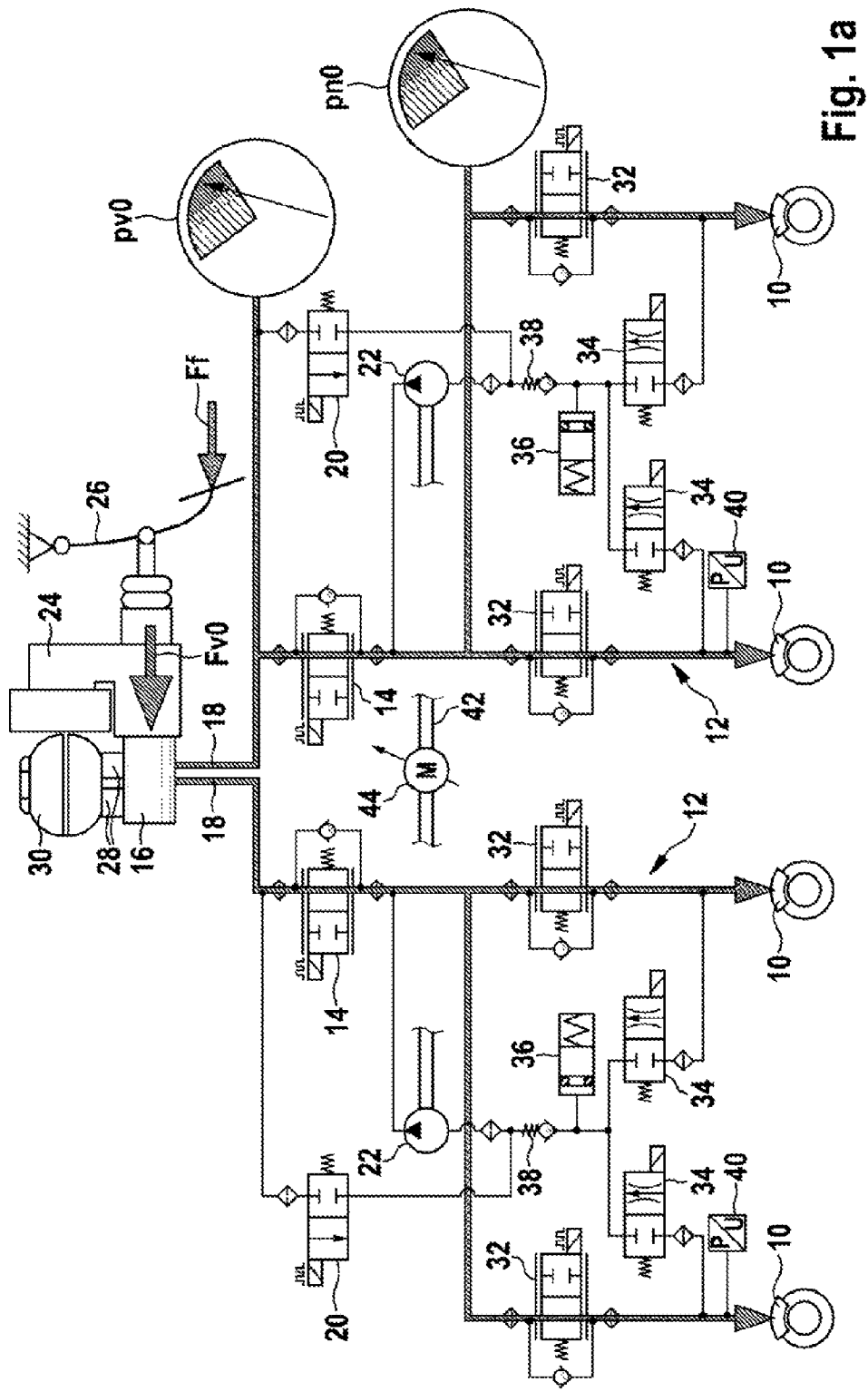
FIGS. 1a and 1b show schematic representations of a brake system to explain a specific embodiment of the method for transferring brake fluid into at least one wheel brake cylinder.
Figure 1B:
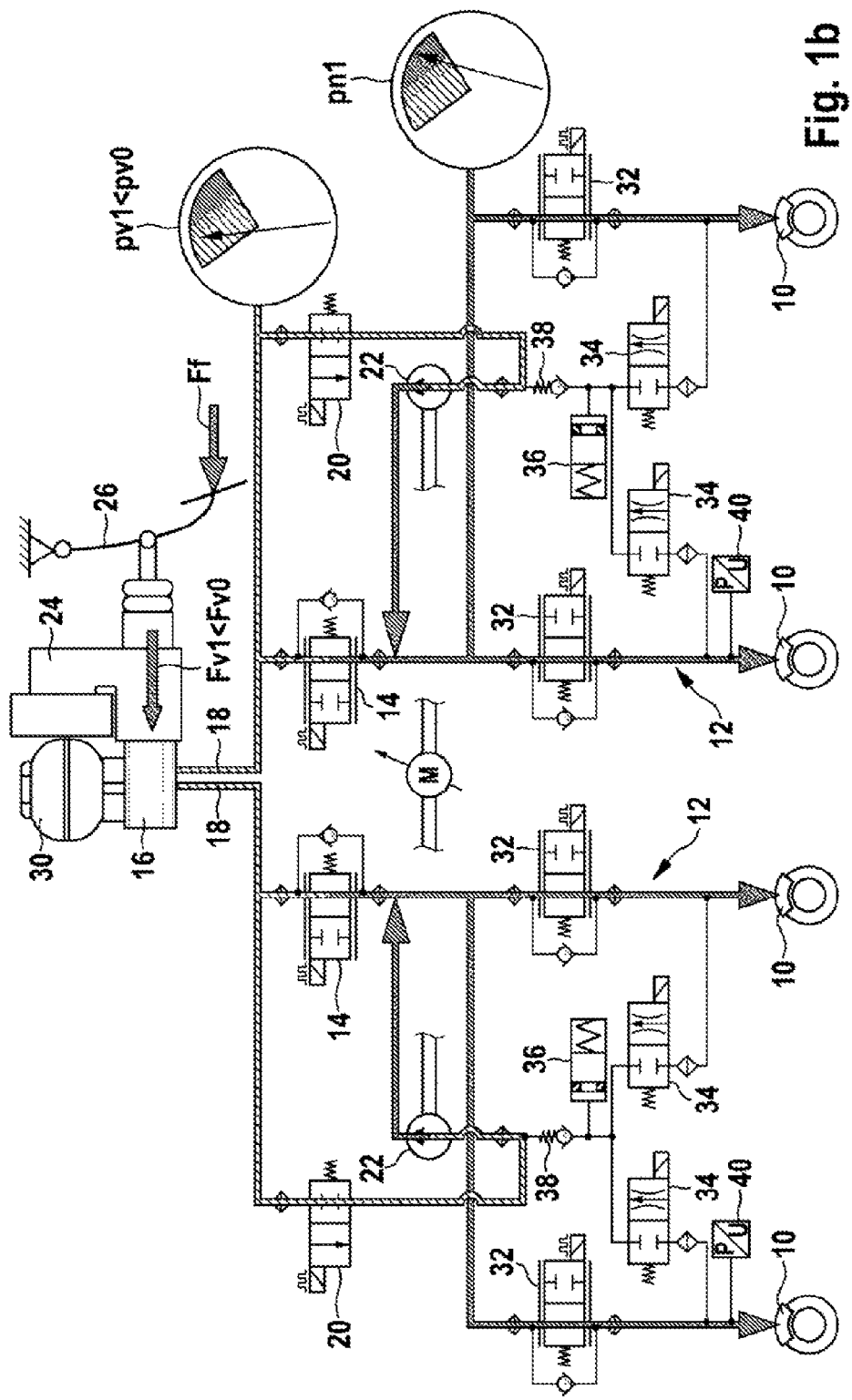

FIGS. 1a and 1b show schematic representations of a brake system to explain a specific embodiment of the method for transferring brake fluid into at least one wheel brake cylinder.

The method described further is able to be carried out using a brake system of a vehicle which has at least one wheel brake cylinder 10. The at least one wheel brake cylinder 10 may be a wheel brake caliper, for example. The ability to develop the at least one wheel brake cylinder 10 is, however, not limited to a wheel brake caliper or a certain type of wheel brake cylinder. The at least one wheel brake cylinder 10 is linked to at least one brake circuit 12, which is connected via a switchover valve 14 in each case to a main brake cylinder 16. For example, in each case a supply line 18 is situated between main brake cylinder 16 and the at least one switchover valve (as a component of the at least one brake circuit 12). In addition, at least one high-pressure switchover valve 20 of the at least one brake circuit 12 is directly or indirectly linked (via supply line 18) to main brake cylinder 16. One may rewrite this to say that the at least one brake circuit 12 is also connected via the at least one high-pressure switchover valve 20 to main brake cylinder 16. (By linking a brake circuit 12 to main brake cylinder 16 via a switchover valve 14 and via a high-pressure switchover valve 20 one may thus also understand that valves 14 and 20 are components of brake circuit 12).

In order further to carry out the method described, the brake system also has at least one pump 22, whose suction side faces the at least one high-pressure switchover valve 20, and by which brake fluid is able to be pumped to the at least one wheel brake cylinder 10. Similarly, a brake system suitable for carrying out the method has a braking force booster 24, using which a boosting force Fv0 is able to be exerted on at least one adjustable piston of main brake cylinder 16. In an optional manner, boosting force Fv0 in addition to a driver brake force Ff, which is exerted on a brake operating element 26, such as a brake pedal, may be transferable to the at least one adjustable piston of main brake cylinder 16.

In FIGS. 1a and 1b braking force booster 24 is developed as an electromechanical braking force booster. It should be pointed out, however, that the ability to carry out the method further described is not limited to the use of an electromechanical braking force booster. Instead, any type of braking force booster 24, which is able to increase or reduce its boosting force Fv0 as a function of one or more signals, is able to be used to carry out the method according to the present invention.

It is also pointed out that the ability to carry out the method further described is not limited to the brake system design shown in FIGS. 1a and 1b and the brake system components reproduced in them. For example, the development of main brake cylinder 14 as a tandem main brake cylinder, which is connected via two balancing bores 28 to a brake fluid reservoir 30, should only be interpreted in an exemplary manner. The equipment of a brake circuit 12 with at least one wheel inlet valve 32 and/or at least one wheel outlet valve 34, which may be especially assigned to a wheel brake cylinder 10, is also only optional and is not a presupposition for the ability to carry out the method further described. Besides, storage chambers 36, check valves 38 and pressure sensors 40 are not necessary for carrying out the method described below.

If the method is carried out using a brake system having two brake circuits 12, each of brake circuits 12 is able to have its own pump 22, the two pumps being able to be situated on a common shaft 42 of a motor 44. This is not, however, a presupposition for the ability to carry out the method. Besides, two wheels assigned to the two wheel brake cylinders 10 of a brake circuit 12 may be positioned both on a common vehicle axle and on a side of the vehicle or diagonally on the vehicle. The method further described may be used both in the case of a brake system having a parallel brake circuit development and a brake system having an X brake circuit development.

FIG. 1a reproduces a possible initial situation, in which the method for transferring brake fluid into at least one wheel brake cylinder 10 is able to be carried out. In the brake system reproduced in FIG. 1a, the driver steps on brake operating element 26 developed as a brake pedal using a comparatively large driver braking force Ff. In order to support the driver with respect to force in braking his vehicle, a relatively large booster force Fv0 is additionally transferred using braking force booster 24, in addition to the at least one adjustable piston of main brake cylinder 16. Consequently, a comparatively large pressure builds up in the two brake circuits 12. To put it another way, an admission pressure pv0 present between main brake cylinder 16, a switchover valve 14 of a brake circuit 12 and a high-pressure switchover valve 20 of the same brake circuit 12 is comparatively large. (Admission pressure pv0 is greater than 100 bar, for example, particularly greater than 120 bar, and especially greater than 140 bar).

Similarly, a downstream pressure pn of a brake circuit 12, which is present between switchover valve 14 and the two wheel brake cylinders 10 of brake circuit 12, is relatively high.

Normally, many brake system users perceive the braking situation reproduced in FIG. 1a as disadvantageous, since a pump 22 of a brake circuit 12 is sometimes no longer able to suck in hardly any/any brake fluid via associated high-pressure switchover valve 20, because of the comparatively large admission pressure pv0. In this case, pumps 22 are not able to be used in the related art, for an additional brake pressure build-up in linked wheel brake cylinder 10. In many customary brake systems, operation of the at least one pump 22 at an admission pressure pv0 above a limit admission pressure is also connected with an increased risk of damage of the at least one pump 22. In a conventional brake system, such as an ESP brake system, in particular, using the pumps 22 for active pressure build-up in the at least one linked wheel brake cylinder 10 at a limit admission pressure of ca. 140 bar is hardly/not able to be carried out any more without the at least one pump 22 being damaged with high probability. In a conventional ESP brake system, therefore, as a rule, as of an admission pressure pv0 of ca. 140 bar, no active pressure build-up is carried out any more.

Using the method described below, even at an initial situation as reproduced in FIG. 1a, an active pressure build-up is still reliably able to be carried out, even if an admission pressure pv0 of 140 bar or more is already present. Besides, the active pressure build-up is possible while simultaneously taking it easy on the at least one pump 22.

For this purpose, at least one switchover valve 14, via which the at least one brake circuit 12, having the at least one wheel brake cylinder 10, is connected to the main brake cylinder 16, is controlled into a closed state. After the controlling of the at least one switchover valve 14 into the closed state, a previously exerted booster force Fv0 of brake booster 24, which is exerted on the at least one adjustable piston of main brake cylinder 16, is reduced. (This is shown in FIG. 1b). Thus, booster force Fv1, exerted thereafter/currently, using brake force booster 24, is below the previously exerted booster force Fv0. Consequently, even if driver braking force Ff remains constant, a lower force is exerted on the at least one adjustable piston of main brake cylinder 16. This effects a reduction in admission pressure pv1 that is present after the booster force reduction, compared to the previous admission pressure pv0.

Based on the at least one switchover valve 14, that was controlled into the closed state, however, downstream pressure pn may be held (approximately) constant even after the booster force reduction, in spite of the reduction in current admission pressure pv1. The reduction in current admission pressure pv1, effected using the method steps described in this instance, thus leads to a smaller downstream pressure pn, and a brake pressure drop in the at least one wheel brake cylinder 10. As a result, in spite of the reduction of admission pressure pv1 compared to previous admission pressure pv0, the braking effect of the at least one wheel brake cylinder 10, that was built up by the driver using driver braking force Ff and using previously exerted booster force Fv0, is reliably maintained.

In a further method step, which is carried out after the reduction of the previously exerted booster force Fv0 to the currently carried out booster force Fv1, the at least one high-pressure switchover valve 20, via which the at least one brake circuit 12 (having the at least one wheel brake cylinder 10) is connected to main brake cylinder 16, is controlled into an at least partially open state. Preferably, the at least one high-pressure switchover valve 20 is controlled into the (completely) open state.

Thus, via the at least partially open, at least one high-pressure switchover valve 20, brake fluid may be sucked in using the at least one pump 22 from main brake cylinder 16 and/or brake fluid reservoir 30) and pumped into the respectively linked at least one wheel brake cylinder 10. Consequently, downstream pressure pn may be raised additionally by using the at least one pump 22. Because of the additional filling of the at least one wheel brake cylinder 10, in particular the brake pressure present in it is also able to be raised additionally. In this way, more rapid braking of the vehicle is able to be achieved. The method described above thus leads to improved braking comfort for the driver.

Preferably, the fluid quantity pumped using the at least one pump 22 in the direction to the at least one wheel brake cylinder 12 and the pumping power of the at least one pump 22 are determined, while taking into account the driver's braking command, a traffic situation and/or state information, with respect to a state of at least one component of the brake system. Using the operation of the at least one pump 22, one is thus able to carry out a further brake pressure increase over the previously set brake pressure, which is attributable to the driver's brake force Ff and the previously set booster force Fv0.

Because of the advantageous reduction of admission pressure pv1 present after the booster force reduction before the activation of the at least one pump 22, the method described above also ensures an improved protection of pump 22. Particularly in this way, in spite of an active pressure build-up carried out, damage to operated pump 22 may be reliably prevented. Consequently, the present invention may also contribute to making replacement part costs and a repair shop visit unnecessary.

It is pointed out that the advantageous method is able to be carried out while using a simple and cost-effective pump 22 of an ESP brake system. Thus, to carry out the advantageous method, no additional or costly component has to be installed in a brake system belonging to the vehicle.

In one advantageous refinement of the method, booster force Fv1 of brake force booster 24 may be raised again after the pumping of brake fluid into the at least one wheel brake caliper 10. For example, booster force Fv1 is set to the previous value Fv0 again. In this way, the pedal feel for the driver is able to be set again advantageously/according to the standard.

The method described in the previous paragraphs may also be utilized for a method for raising a brake pressure in at least one wheel brake cylinder of a brake system of a vehicle. In this method, preferably after determining a setpoint brake pressure increase unequal to zero, at least one admission pressure magnitude with respect to an admission pressure pry is ascertained, that is present at least between the at least one high-pressure switchover valve 20 and main brake cylinder 16 of the brake system. Subsequently, the at least one admission pressure magnitude is compared to at least one boundary value. If the at least one admission pressure magnitude is greater than the at least one boundary value, the brake pressure in the at least one wheel brake cylinder 10 is raised by transferring fluid into the at least one wheel brake cylinder, according to one specific embodiment of the method described above.

Additionally, this procedure may also be used as a method for operating a brake system of a vehicle. In the method for operating a brake system of a vehicle, a temperature magnitude and/or a temporarily-influencing model variable with respect to a temperature is ascertained that is present at or in at least one wheel brake cylinder 10 of the brake system. Instead of a direct measurement of the respective temperature, a temperature-influencing model variable, such as a variable with respect to the braking behavior, the braking duration and/or the braking intensity may also be ascertained.

The temperature variable ascertained is then compared to a comparison variable. If the ascertained temperature variable is greater than the comparison variable, the raising of the brake pressure takes place (according to a determined setpoint brake pressure increase) in the at least one wheel brake cylinder 10, according to the procedure described above. Consequently, particularly in the case of fading but also in the case of a comparatively large admission pressure pv0, an increase in the brake pressure in the at least one wheel brake cylinder 10 using pump 22 may be carried out. Fading means that the coefficient of friction of the braking system has been lowered based on a high temperature. Consequently, in the case of fading, which occurs above all at a high temperature at the at least one wheel brake cylinder 10, one should advantageously put into effect a relatively high brake pressure, in order to put into effect a reliable deceleration of the vehicle. Using the method described here, for operating a brake system of a vehicle, the possible presence of fading is, however, determined/established with high probability, and subsequently an active brake pressure build-up may still be effected using the at least one pump 22, even when there is a comparatively large admission pressure prv0. Thus, one is able to act to counter a possible fading.

FIG. 2 shows a schematic representation of a specific embodiment of the control device.

Control device 48 shown schematically in FIG. 2 is designed for use together with a vehicle brake system. Control device 48 may, in particular, be a subunit of the brake system. Control device 48 may also be developed as an ESP control unit, as a brake force booster-control electronics system, such as a subunit of brake force booster 24, as a chassis controller and/or as a central vehicle control system. However, the practicability of control device 48 is not limited to the examples enumerated here.

Control device 48 that is schematically reproduced in FIG. 2 has a brake pressure control device 50, using which, at least when brake pressure control device 50 is present in a first pressure increase mode, at least one closing signal 52 is able to be output to at least one switchover valve 14 of the brake system. Using the at least one closing signal 52, the at least one switchover valve 14 of the brake system cooperating with control device 48 is controllable to a closed state. After outputting the at least one closing signal 52 (to the at least one switchover valve 14), at least one booster force reduction signal 54 is able to be output to a brake force booster 24 using brake pressure control device 50. Brake force booster 24 is actuated by the at least one booster force reduction signal 54, in such a way that a booster force exerted on at least one adjustable piston of the main brake cylinder of the brake system cooperating with control device 48 is reduced. Signals 52 and 54, that are able to be output using brake pressure control device 50, thus have the effect already described above, of the advantageous reduction in the admission pressure.

After the outputting of booster force reduction signal 54 (to brake force booster 24), at least one (partial) opening control signal 56 is also able to be output to at least one high-pressure switchover valve 20 of the brake system. The at least one high-pressure switchover valve 20 is able to be controlled into an at least partially opened state, preferably into a (completely) opened state by the outputting of the at least one (partial) opening control signal 56.

After the outputting of at least the one (partial) opening control signal 56 (to the at least one high-pressure switchover valve 20), using brake pressure control device 50, still at least one activating signal 58 is able to be output to the at least one pump 22 of the brake system in such a way that, using the at least one pump 22, brake fluid is able to be sucked in via the at least partially opened, at least one high-pressure switchover valve 20 and is able to be pumped into at least one wheel brake cylinder of the brake system. Using the at least one activating signal 58, the at least one pump 22 is advantageously able to be actuated in such a way that a pumping performance/a pumped brake fluid volume corresponds to a currently exerted driver brake force, a traffic situation and/or a state of at least one brake system component, such as a fading at one wheel brake cylinder. Thus, an active brake pressure build-up may be carried out using signals 56 and 58, whereby a brake pressure that is present in the at least one wheel brake cylinder is advantageously able to be raised.

In one advantageous refinement, brake pressure control device 50 is, in addition, designed to raise the booster force of brake force booster 24, after the pumping 22 of brake fluid into the at least one wheel brake cylinder, using an optional booster force raising signal 60. The reduction of the booster force is thus able to be limited to a time interval which is so short that the driver does not perceive/hardly perceives the changed booster force during an operation of the brake operating element. Consequently, the driver has a brake operating feel (pedal feel) that is according to standard, in spite of the reduction of the admission pressure in the meantime.

Furthermore, brake pressure control device 50 may additionally be designed, after the increase in the booster force of brake force booster 24 (using booster force raising signal 60) to control the at least one switchover valve 14 to at least partially open using a further partially opening control signal 62. Thus, even after carrying out the advantageous function for the active pressure build-up, the driver is still able to brake directly into the at least one wheel brake cylinder.

In one advantageous refinement, control device 48 has, in addition, an admission pressure evaluation device 64, whereby (at least before an active pressure build-up carried out using brake pressure control device 50) at least one provided admission pressure variable 66, with respect to an admission pressure that is present between a switchover valve 14, a high-pressure switchover valve 20 and a main brake cylinder of the brake system is able to be compared to at least one (specified) boundary value 68. The at least one boundary value 68 may be provided by an internal memory unit 70, for example. If the at least one admission variable 66 is greater than the at least one boundary value 68, the admission pressure evaluation device 64 is preferably designed to control brake pressure control device 50 from at least one second pressure increase mode into the first pressure increase mode, using a switching signal 72.

In the second pressure raising mode, the admission pressure evaluation device 64 is able to be designed for the purpose of carrying out an active brake pressure build-up without carrying out a reduction in the admission pressure in the meantime. By contrast, brake pressure control device 50 is designed in the first pressure increase mode to reduce the admission pressure at least intermittently before the active brake pressure build-up. Because of the cooperation of brake pressure control device 50 with admission pressure evaluation device 64, it may thus be ensured that a reduction of the admission pressure takes place only if the admission pressure is at a comparatively high value, which makes more difficult using at least one pump 22 for an active pressure build-up, and means a high risk of damage for the at least one pump 22 used for the active pressure build-up.

In one further advantageous refinement, control device 48 also has a temperature evaluation device 74. Temperature evaluation device 74 is preferably designed so that, using it, a provided temperature variable 76 and/or a provided temperature influencing model variable with respect to a temperature present at or in at least one wheel brake cylinder of the brake system is able to be compared to at least one comparison variable 78 (that is specified). The at least one comparison variable 78 may be specified using internal memory unit 70. If temperature variable 76 and/or the temperature-influencing model variable is greater than comparison variable 78, temperature evaluation device 74 is preferably designed to output an activating signal 80 to admission pressure evaluation device 64. Using activating signal 80, admission pressure evaluation device 64 may be controlled from an inactive mode to an active mode, in which admission pressure evaluation device 64 carries out the function already described above of a comparison of variable 66 to boundary value 68, and actuates brake pressure control device 50 accordingly. If this is desired, the advantageous taking into account of the admission pressure during an active pressure build-up thus takes place only if, based on a probable fading at the at least one wheel brake cylinder, an increased brake pressure is set comparatively frequently.

The advantages of control device 48 described in the above paragraphs are also assured in a brake system for a vehicle having such a control device 48.

What is claimed is:

1. A method for transferring brake fluid into at least one wheel brake cylinder of a brake system of a vehicle, comprising:
   controlling at least one switchover valve into a closed state, wherein at least one brake circuit having the at least one wheel brake cylinder is connected to a main brake cylinder of the brake system via the at least one switchover valve;
   reducing a booster force of a brake force booster, which is exerted upon at least one adjustable piston of the main brake cylinder, after the controlling of the at least one switchover valve into the closed state;
   controlling at least one high-pressure switchover valve into an at least partially opened state after the reduction of the booster force of the brake force booster, wherein the at least one brake circuit having the at least one wheel brake cylinder is connected to the main brake cylinder via the at least one high-pressure switchover valve; and
   sucking in brake fluid via the at least one high-pressure switchover valve which is at least partially opened, and pumping the brake fluid into the at least one wheel brake cylinder.

2. The method as recited in claim 1, wherein, after the pumping of the brake fluid into the at least one wheel brake cylinder, the booster force of the brake force booster is raised.

3. The method as recited in claim 2, wherein, after the raising of the booster force of the brake force booster, the at least one switchover valve is at least partially opened.

4. A method for raising a brake pressure in at least one wheel brake cylinder of a brake system of a vehicle, comprising:
   ascertaining at least one admission pressure variable with respect to an admission pressure which is present between at least one high-pressure switchover valve and a main brake cylinder of the brake system;
   comparing the at least one admission pressure variable to at least one boundary value; and
   if the at least one admission pressure variable is greater than the at least one boundary value, raising the brake pressure in the at least one wheel brake cylinder by transferring brake fluid into the at least one wheel brake cylinder by:
      controlling at least one switchover valve into a closed state, wherein at least one brake circuit having the at least one wheel brake cylinder is connected to the main brake cylinder of the brake system via the at least one switchover valve;
      reducing a booster force of a brake force booster, which is exerted upon at least one adjustable piston of the main brake cylinder, after the controlling of the at least one switchover valve into the closed state;
      controlling the at least one high-pressure switchover valve into an at least partially opened state after the reduction of the booster force of the brake force booster, wherein the at least one brake circuit having the at least one wheel brake cylinder is connected to the main brake cylinder via the at least one high-pressure switchover valve; and
      sucking in brake fluid via the at least one high-pressure switchover valve which is at least partially opened, and pumping the brake fluid into the at least one wheel brake cylinder.

5. The method according to claim 4, further comprising:
   ascertaining at least one of a temperature variable and a temperature-influencing model variable with respect to a temperature which is present one of on or in at least one wheel brake cylinder of the brake system; and
   comparing the at least one of the ascertained temperature variable and the ascertained temperature-influencing model variable to at least one comparison variable;
   wherein the brake pressure in the at least one wheel brake cylinder is raised if the at least one of the ascertained temperature variable and the ascertained temperature-influencing model variable is greater than the at least one comparison variable.

6. A control device for a brake system of a vehicle, comprising:
   a brake pressure control device which:
      outputs at least one closing signal to at least one switchover valve of the brake system if the brake pressure control device is in a first pressure-raising mode;
      after the outputting of the at least one closing signal to the at least one switchover valve, outputs at least one booster force reduction signal to a brake force booster of the brake system;
      after the outputting of the booster force reduction signal to the brake force booster, outputs at least one partial opening control signal to at least one high-pressure switchover valve of the brake system; and
      after the outputting of the at least one partial opening control signal to the at least one high-pressure switchover valve, outputs at least one activating signal to at least one pump of the brake system in such a way that, using the at least one pump, (i) brake fluid is sucked in via the at least one high-pressure switchover valve which is at least partially opened, and (ii) brake fluid is pumped into at least one wheel brake cylinder of the brake system.

7. The control device as recited in claim 6, wherein the brake pressure control device raises the booster force of the brake force booster, after the pumping of brake fluid into the at least one wheel brake cylinder.

8. The control device as recited in claim 7, wherein the brake pressure control device controls the at least one switchover valve to at least a partially opened state, after the raising of the booster force of the brake force booster.

9. The control device as recited in claim 7, further comprising:
an admission pressure evaluation device which compares at least one admission pressure variable representing an admission pressure present between the at least one high-pressure switchover valve and a main brake cylinder of the brake system to at least one boundary value;
wherein, if the at least one admission pressure variable is greater than the at least one boundary value, the brake pressure control device is switched from at least one second pressure-raising mode to the first pressure-raising mode.

10. The control device as recited in claim 9, further comprising:
a temperature evaluation device which compares (i) at least one of a temperature variable and a temperature-influencing model variable with respect to temperature present one of on or in the at least one wheel brake cylinder of the brake system to (ii) at least one comparison variable;
wherein, if the at least one of the temperature variable and the temperature-influencing model variable is greater than the at least one comparison variable, an activating signal is output to the admission pressure evaluation device.

11. The control device as recited in claim 10, wherein the control device is configures as at least one of an ESP control unit, a brake force booster control electronics system, a chassis control unit and a central vehicle control system.

* * * * *